(12) United States Patent
Biskeborn (10) Patent No.: US 6,781,792 B2
(45) Date of Patent: Aug. 24, 2004

(54) METHOD AND APPARATUS FOR PROVIDING TAPE HEAD ASSEMBLIES HAVING U-SHAPED SUPPORT BEAMS FOR VERY HIGH DENSITY RECORDING

(75) Inventor: Robert Glenn Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 09/938,178

(22) Filed: Aug. 23, 2001

(65) Prior Publication Data

US 2003/0039069 A1 Feb. 27, 2003

(51) Int. Cl.⁷ ............................. G11B 5/187; G11B 5/29
(52) U.S. Cl. ..................... 360/129; 360/121; 360/122; 360/130.21
(58) Field of Search ...................... 360/84, 121, 122, 360/125, 126, 128, 129

(56) References Cited

U.S. PATENT DOCUMENTS

| | | | |
|---|---|---|---|
| 4,546,541 A | * 10/1985 | Reid | 29/603.14 |
| 4,823,221 A | 4/1989 | McConica et al. | 360/125 |
| 5,033,184 A | 7/1991 | Tandai et al. | 29/603.06 |
| 5,124,866 A | 6/1992 | Rothermel | 360/241 |
| 5,237,476 A | 8/1993 | Bischoff et al. | 360/126 |
| 5,239,434 A | 8/1993 | Naito et al. | 360/125 |
| 5,513,057 A | * 4/1996 | Zieren et al. | 360/122 |
| 5,541,793 A | * 7/1996 | Schwarz | 360/121 |
| 5,594,608 A | 1/1997 | Dee | 360/126 |
| 5,883,770 A | * 3/1999 | Biskeborn et al. | 360/130.21 |
| 5,905,613 A | * 5/1999 | Biskeborn et al. | 360/130.21 |
| 5,909,343 A | 6/1999 | Kanno et al. | 360/271.5 |
| 5,943,196 A | 8/1999 | Chaug | 360/126 |
| 6,038,108 A | 3/2000 | Dee et al. | 360/121 |
| 6,040,964 A | 3/2000 | Saliba | 360/121 |
| 6,088,184 A | * 7/2000 | Hu | 360/76 |
| 6,577,469 B2 | * 6/2003 | Kennedy et al. | 360/121 |
| 6,577,470 B1 | * 6/2003 | Rumpler | 360/122 |

FOREIGN PATENT DOCUMENTS

| | | | |
|---|---|---|---|
| JP | 63-266613 A | * | 11/1988 |
| JP | 2-278509 A | * | 11/1990 |
| JP | 10-320732 A | * | 12/1998 |

* cited by examiner

Primary Examiner—Jefferson Evans
(74) Attorney, Agent, or Firm—Crawford Maunu PLLC (57) ABSTRACT

A tape head and method for forming a tape head are disclosed. The tape head includes a matched support beam pair, each support beam having a tape head disposed on the support beam, each support beam further including engagement surfaces and a recessed area disposed between the engagement surfaces, the matched pair being joined at the engagement surfaces, and the recess areas providing a cable receptacle for framing a cable that is attached to the tape head. The tape head and method for forming a tape head provides tape head assemblies with precise tape wrap angle setting, track-to-tack registration, and head-to-head parallelism suitable for very high density recording. By attaching a read-after-write pair of magnetic recording heads to two rigid, precision U-shaped support beams, the tape heads can be an aligned and hold this alignment accuracy during assembly processing.

21 Claims, 8 Drawing Sheets

METHOD AND APPARATUS FOR PROVIDING TAPE HEAD ASSEMBLIES HAVING U-SHAPED SUPPORT BEAMS FOR VERY HIGH DENSITY RECORDING

BACKGROUND OF THE INVENTION

1. Field of the Invention

This invention relates in general to tape head assemblies, and more particularly to a method and apparatus for providing tape head assemblies for very high density recording.

2. Description of Related Art

In high-speed data processing systems, magnetic recording has been employed for large storage capacity requirements. In magnetic storage systems, data is read from and written onto magnetic recording media utilizing magnetic transducers commonly referred to as magnetic heads. Data is written on the magnetic material by moving a magnetic recording head to a position over the magnetic material where the data is to be stored. The magnetic recording head then generates a magnetic field, which encodes the data into the magnetic material. Data is read from the media by similarly positioning the magnetic read head and then sensing the magnetic field of the magnetic material. Read and write operations are independently synchronized with the movement of the media to insure that the data can be read from and written to the desired location on the magnetic material.

An important and continuing goal in the data storage industry is that of increasing the density of data stored on a medium. For tape storage systems, that goal has lead to increasing the track density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the tape surface of the tape head at high speed. This movement generally entrains a film of air between the head and tape. Usually the tape head is designed to minimize the spacing between the head and the tape.

During operation, an actuator mechanism moves the head and magnetic transducers to a desired position on the surface of the moving medium where the head electromagnetically reads or writes data. Typically, the magnetic transducers are integrally fabricated in a carrier or support referred to as a "slider". The slider generally serves to mechanically support the head transducers and any electrical connections between the head and the remainder of the storage system.

In order to meet the demand for increasing areal densities in magnetic tape, many technological innovations are required. In order to improve data reliability, a read element corresponding to each write element reads the magnetic field from the tape immediately after it is written. This technique is known as read-while-write. To increase data transfer, the tape may be written as it travels in either direction across the tape head. This requires a read element downstream of each write resulting in a read-write-read head configuration.

A read-while-write head assembly comprises a write element in-line with a read element, the gap of the read element being accurately spaced to the gap of the write element, with the read element positioned downstream of the write element in the direction of tape motion. By continually reading "just recorded" data, the quality of the recorded data is immediately determinable at a time when the original data is still available in temporary storage in the recording system. The reproduced data is checked against the original data, and appropriate action, such as re-recording, may be taken in case of error.

Conventional thin film tape heads are fabricated using processes similar to those used in direct access storage device (DASD)) heads. The process provides a plurality of layers deposited on the surface of a substrate to form the tape head transducers. For a tape head assembly, the read-after-write pair of magnetic recording heads include a first write element adjacent to a read element which is adjacent to a second write element, or a first read element adjacent to a write element which is adjacent to a second read element. Cables are then electrically attached to the heads to provide signal leads.

The next step is to join the cabled heads together to form the read-while-write unit. However, the two tape head sections may shift relative to one another during this joining process. Shifting of the two modules can affect tape wrap angle, track-to-track registration, and head-to-head parallelism. Previous two module tape head build methods do not have generally the required level of precision for modern high density recording applications.

In addition, heads are now built with flat rather than curved tape bearing surfaces, as described in U.S. Pat. No. 5,905,613. These heads, when constructed for high density recording, have critical module-to-module alignment It can be seen that there is a need for a method and apparatus for providing tape head assemblies that prevent head shifting during adhesive setting.

It can be seen that there is a need for a method and apparatus for providing tape head assemblies that provides precise tape wrap angle setting, track-to-track registration, and head-to-head parallelism.

SUMMARY OF THE INVENTION

To overcome the limitations in the prior art described above, and to overcome other limitations that will become apparent upon reading and understanding the present specification, the present invention discloses a method and apparatus for providing tape head assemblies that prevent module misalignment during assembly.

The present invention solves the above-described problems by attaching a read-after-write pair of magnetic recording heads to two rigid, precision U-shaped support beams that are subsequently joined together by joining the legs of the U-shaped support beams using, for example, a joining agent. Distortions caused by the joining process have minimal effect on wrap angle and track-to-track registration. For example, if the joining agent expands or contracts during the assembly process, the dominant effect is to slightly alter the module-to-module separation, not the angle, relative height or track-to-track alignment.

A tape head sub-assembly in accordance with the principles of the present invention includes a support beam having engagement surfaces and a recessed area disposed between the engagement surfaces and a tape head disposed on the support beam, wherein the recess area provides a cable receptacle for framing a cable that is attached to the tape head.

Other embodiments of a tape head sub-assembly in accordance with the principles of the invention may include alternative or optional additional aspects. One such aspect of the tape head sub-assembly of the present invention is that the support beam further comprises an angled edge on the engagement surface to provide a predetermined tape wrap angle.

Another aspect of the tape head sub-assembly of the present invention is that the support beam further comprises an angled top surface on the engagement surface to provide a predetermined tape wrap angle.

Another aspect of the tape head sub-assembly of the present invention is that the tape head comprises a substrate and a closure piece separated by a plurality of layers forming magnetic transducers.

In another embodiment of the present invention, a tape head is provided. The tape head includes a matched support beam pair, each support beam having a tape head disposed on the support beam, each support beam further including engagement surfaces and a recessed area disposed between the engagement surfaces the matched pair being joined at the engagement surfaces, the recess areas providing a cable receptacle for framing a cable that is attached to the tape head.

Another aspect of the tape head of the present invention is that each of the support beams further includes an angled engagement surface to provide a predetermined tape wrap angle.

Another aspect of the tape head of the present invention is that each of the support beams further includes an angled top surface to provide a predetermined tape wrap angle.

Another aspect of the tape head of the present invention is that the angled front edge provides a tape wrap angle of approximately 1.2 to 2.0 degrees.

Another aspect of the tape head of the present invention is that each of the tape heads includes a substrate and a closure piece separated by a plurality of layers forming magnetic transducers.

Another aspect of the tape head of the present invention is that the engagement areas are aligned to provide critical height, wrap angle and track-to-track alignment.

Another aspect of the tape head of the present invention is that the tape head further includes a joining agent disposed between the engagement areas to join the two support beams together.

A further embodiment of the present invention provides yet another tape head. The tape head includes a pair of matched support means, each support means including a tape head disposed on the support beam, each support means further including engagement means and a cable receptacle means disposed between the engagement means for framing a cable that is attached to the tape head, the pair of matched support means being joined at the engagement means.

In another embodiment of the present invention, a method of forming a tape head is provided. The method for forming the tape head includes positioning a pair of support beams each having engagement areas and a recessed area with the engagement areas of a first of the pair of support beams in close proximity to the engagement areas of a second of the pair of support beams, performing a predetermined alignment of the pair of support beams and joining the pair of support beams together using a joining agent in a gap between the engagement areas of the support beams.

Another aspect of the method for forming a tape head according to the present invention is that the support beams further comprise a tape head bonded to a top surface of each support beam.

Another aspect of the method for forming a tape head according to the present invention is that the tape heads include wafer processed thin film tape heads.

Another aspect of the method for forming a tape head according to the present invention is that the method further includes coupling cables to the tape heads and to the support beams in the recessed areas to provide strain relief in the region between the engagement areas.

Another aspect of the method for forming a tape head according to the present invention is that the support beams are generally U-shaped.

Another aspect of the method for forming a tape head according to the present invention is that performing a predetermined alignment of the pair of support beams further includes performing height, wrap angle and track-to-track alignments.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for providing tape head assemblies that prevent head shifting during adhesive setting. The method and apparatus provides tape head assemblies with precise tape wrap angle, trackto-track registration, and head-to-head parallelism. By attaching a read-after-write pair of magnetic recording heads to two rigid, precision U-shaped support beams and then joining the U-shaped support beams, the tape heads are prevented from shifting relative to one another as the joining agent sets.

Figure 1:
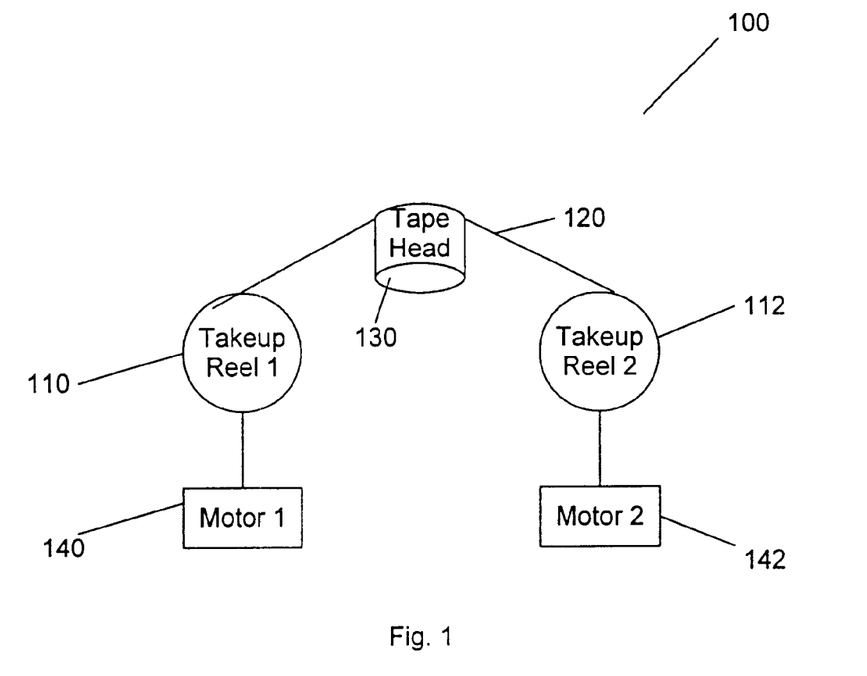
FIG. 1 illustrates a tape system 100 according to the present invention.

FIG. 1 illustrates a tape system 100 according to the present invention. The tape system 100 includes a first supply and a second take-up reel 110, 112. Magnetic recording tape 120 is spooled on the first and second take-up reels 110, 112. The magnetic recording tape 120 is routed over a tape read/write head 130 for reading and writing data on the magnetic recording tape 120. Take-up reel motors 140, 142 control the movement of the magnetic recording tape 120 over the tape read/write head 130.

Figure 2A:
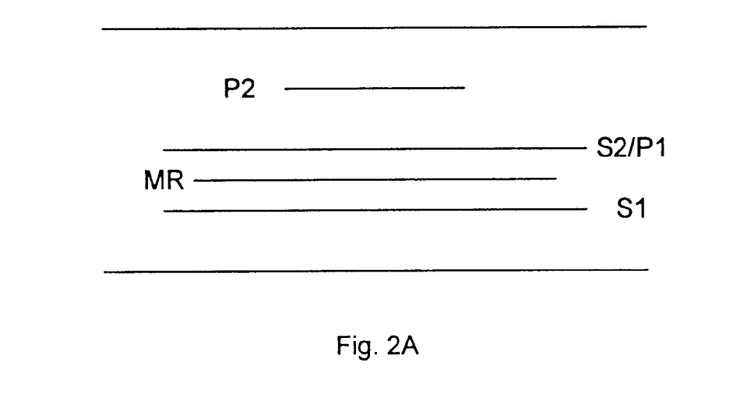
FIG. 2A is a simple diagram of a merged head.

Many modern tape recording systems require operation where writing and reading of the data occurs for either direction of tape travel. The streaming tape system where the recording is laid down on the tape for alternate directions of tape travel is an example of such a bi-directional recording system. Piggyback magnetoresistive read and write element structures have been used in DASD (direct access storage devices; i.e., hard disk) recording heads. FIG. 2A is a simple diagram of a merged head. In FIG. 2A, the MR element is shown disposed between the first shield and the second shield. The second shield also acts as a first pole for an inductive write head that is completed with the second pole. Merged or piggyback read and write elements can be used in a read-after-write application such as described herein for magnetic tape application, but these must be used in pairs, like side-by-side readers and writers because of the problems feedthrough presents.

Figure 2B:
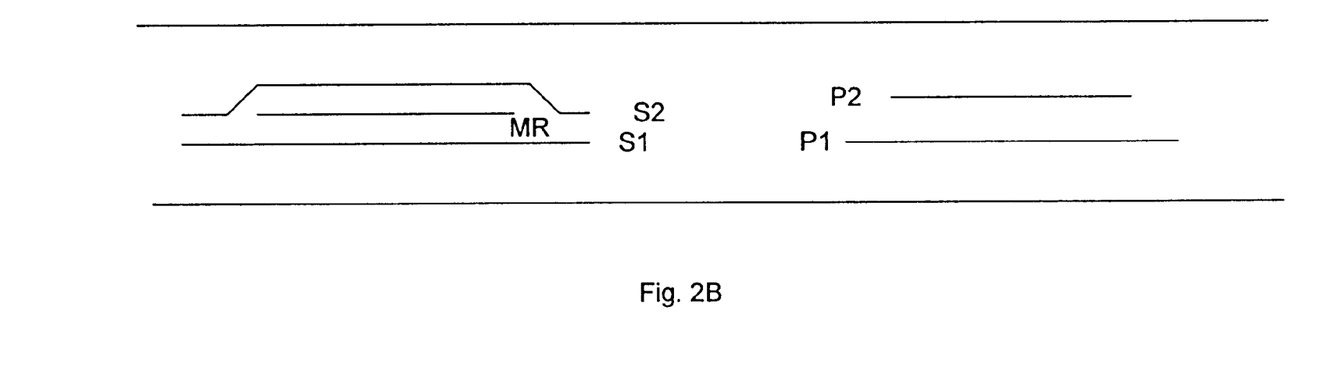
FIG. 2B is a simple diagram of a side-by-side head.

Incorporation of read-while-writing capability for bi-directional operation has traditionally necessitated a head assembly consisting either of: a first read element adjacent to a write element which is adjacent to a second read element or a side-by-side head which is shown in FIG. 2B. FIG. 2B is a simple diagram of a side-by-side head. In FIG. 2B, the MR read head is shown to the left and includes the MR element and a first and second magnetic shield. The write head is formed beside the read head; here to the right of the MR read head. The write head is formed by the first and second poles.

Figure 3:
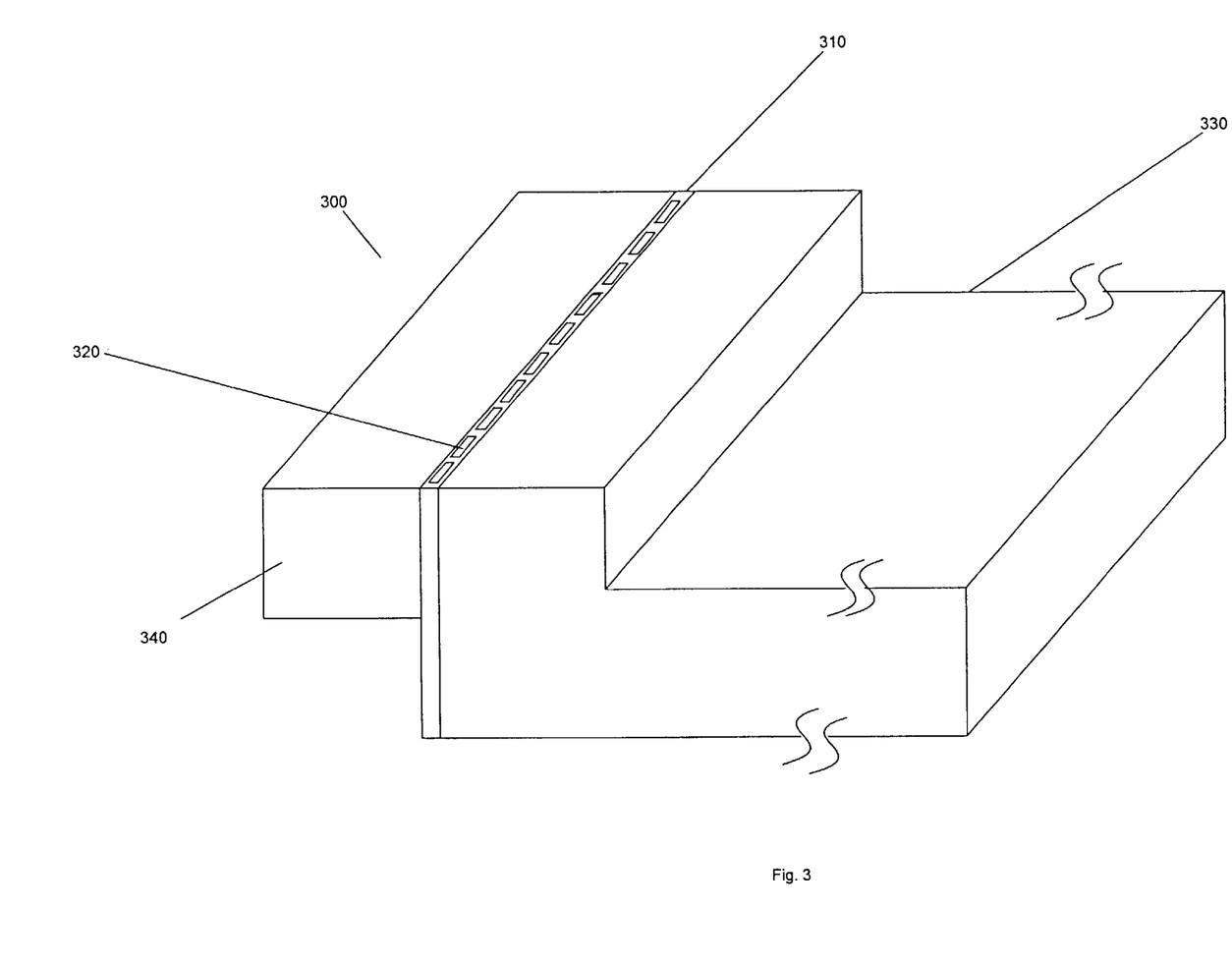
FIG. 3 illustrates a read-while-write head according to the present invention.

A read-while-write head assembly comprises a write element in-line with a read element, the gap of the read element being closely spaced to the gap of the write element, with the read element positioned downstream of the write element in the direction of tape motion. FIG. 3 illustrates a read-while-write head 300 according to the present invention. In FIG. 3, the layers 310 for the read-while-write transducer elements 320 are deposited on a substrate 330. The substrate 330 is separated from a closure 340 by the plurality of layers 310 forming the read-while-write transducers 320.

Figure 4:
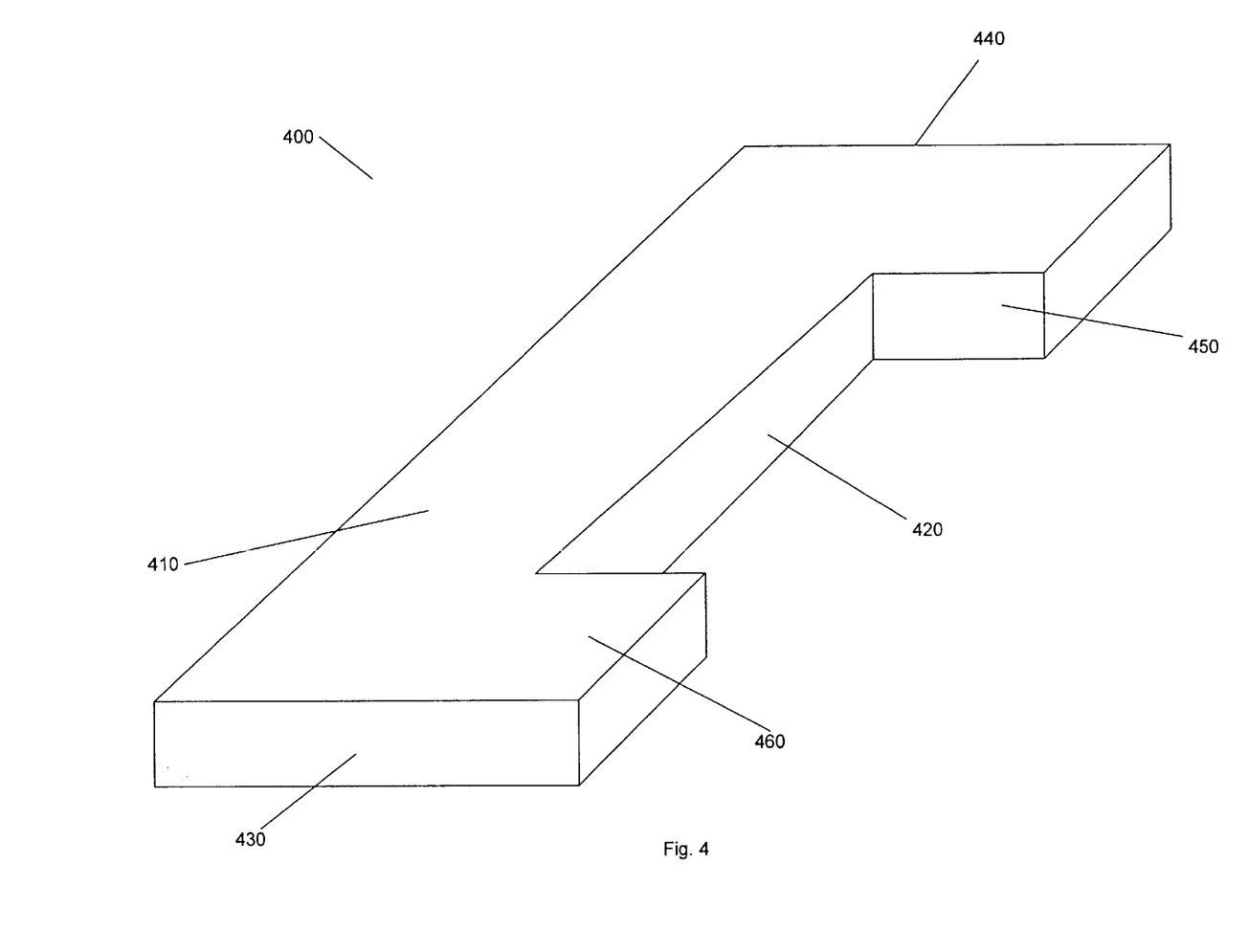
FIG. 4 illustrates a U-beam support beam according to the present invention.

FIG. 4 illustrates a U-shaped support beam 400 according to the present invention. The U-shaped support beam 400 comprises a flat beam 410 having a recess 420 disposed between the ends 430, 440. The recess 420 forms two U-beam projections or legs 450, 460 at either side of the U-beam. The ends of the legs 420 may also be referred to herein as engagement areas because they provide surfaces that may be joined with like engagement surfaces on a coordinated U-beam. The shape of the beam, however, is not limited to a U-shape, but must provide engagement surfaces and a recessed portion 420. The recessed portion 420 allows cables to be electrically attached to the read-while-write heads and bonded to the U-beam 400 for strain relief in the region between the legs 450, 460. For example, the cables may be coupled to the tape heads by ultrasonically bonding the cables to the support beams. Thus, the recess portion 420 provides a receptacle for training a cable that is attached to a tape head disposed on the U-beam 400.

Figures 5, 9:
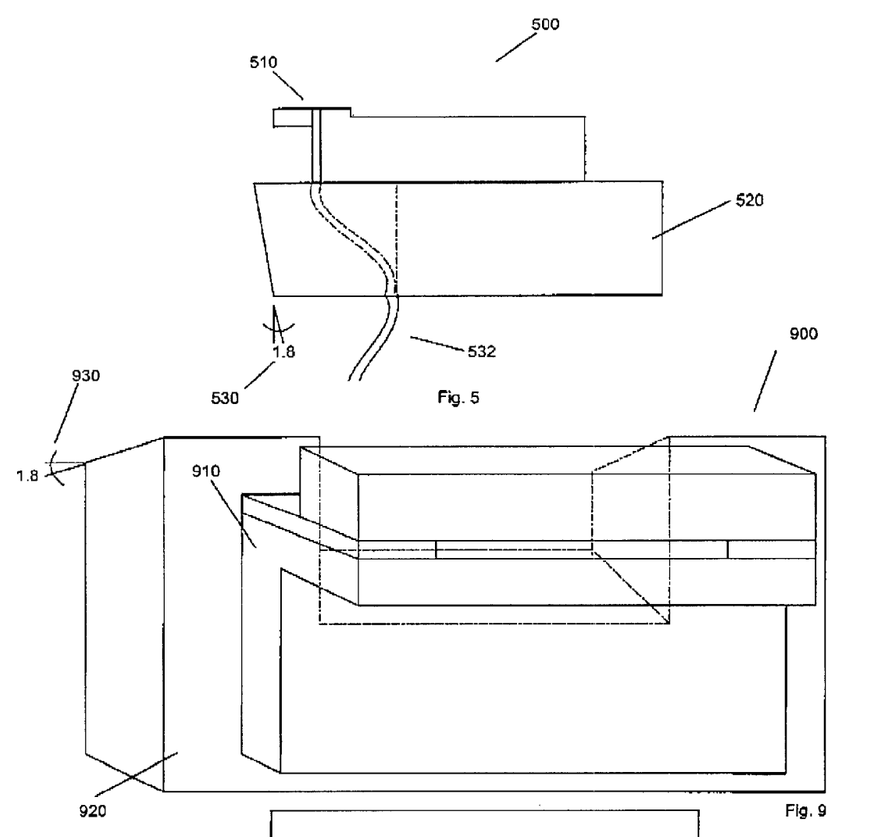
FIG. 5 illustrates a tape head sub-assembly according to the present invention.
FIG. 9 illustrates a perspective view of the tape head sub-assembly of FIG. 5 according to an embodiment of the present invention.
Figure 6A:
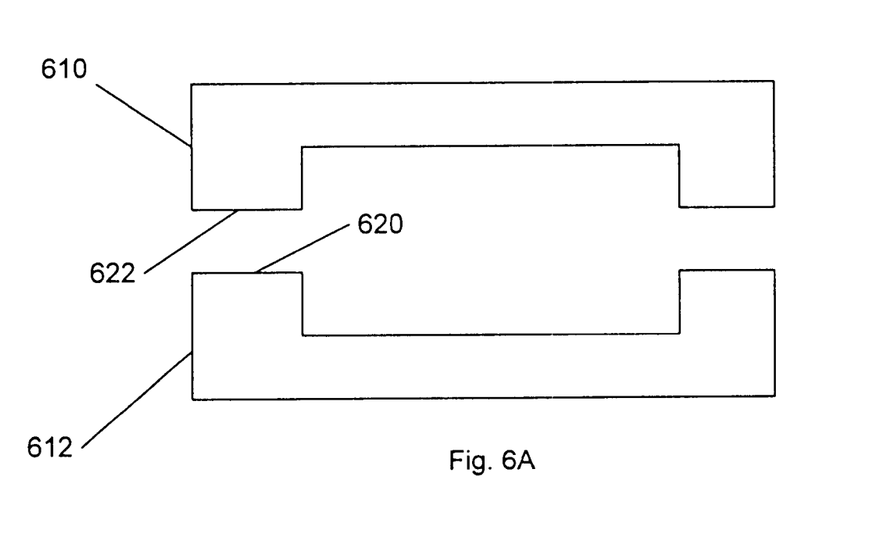
FIG. 6A shows two U-beams prior to application of a joining agent.
Figure 6B:
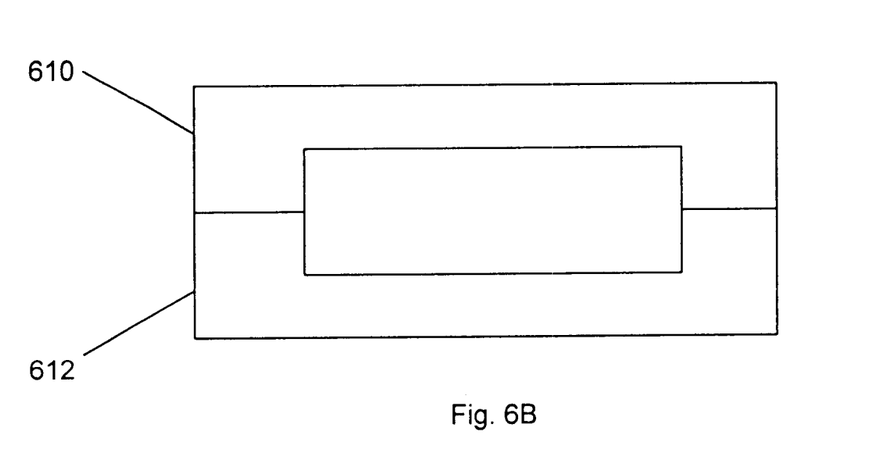
FIG. 6B shows the joining of the two U-beams.

FIG. 5 illustrates a tape head sub-assembly 500 according to the present invention. The tape head sub-assembly 500 includes a transducer structure or thin film tape head 510, for example comprising a cable 532 coupled to a read-after-write pair of magnetic heads or transducers that is attached to a rigid, precision U-shaped support beam 520. Wafer processed thin film tape heads 510 are fabricated and bonded to the top surfaces of the U-beam 520 prior to joining the two U-beams together (as will be FIG. 6a shows two U-beams 610, 612 prior to application of a joining agent. The two U-beams 610, 612 are typically joined together using a joining agent. A joining agent is applied to the legs 620, 622. The two U-beams 610, 612 are then joined as shown in FIG. 6b. This procedure solves the problem of the individual heads shifting relative to one another as the joining agent cures by placing the critical dimensions of the critical path. Moreover, this method results in very precise tape wrap angle setting, track-to-track registration, and head-to-head parallelism.

Figure 7:
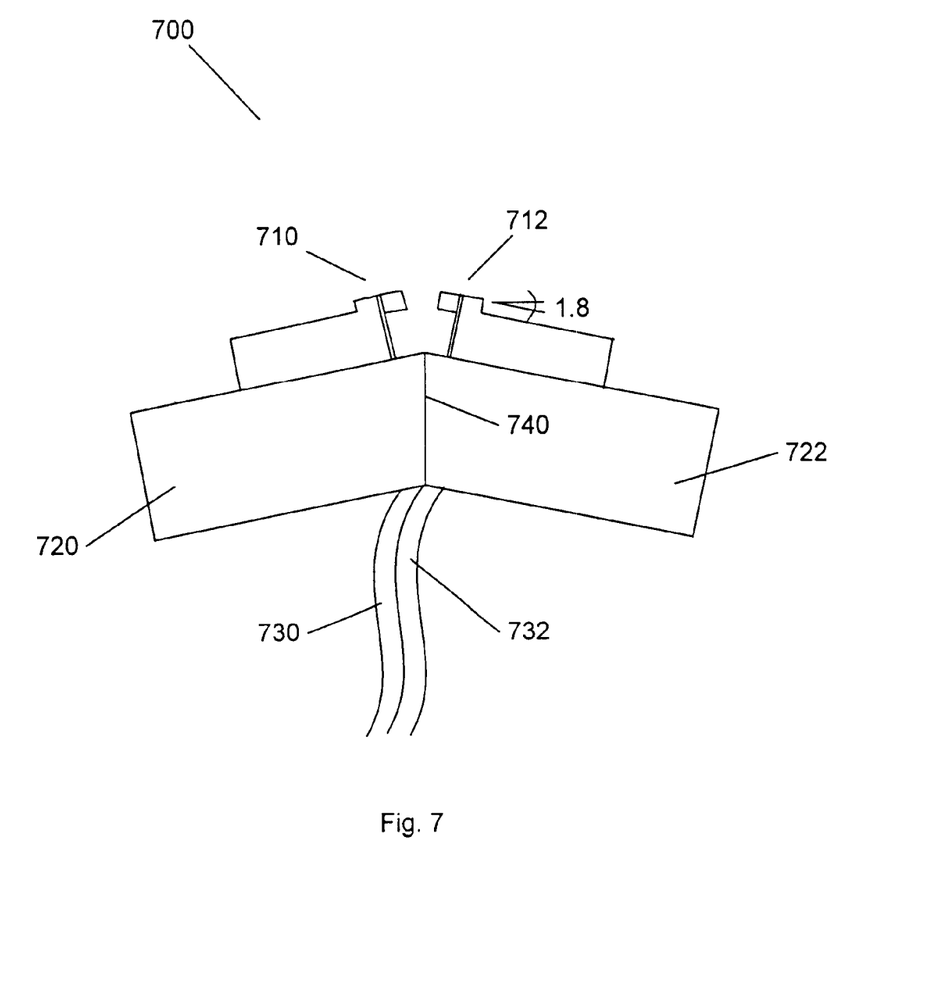
FIG. 7 illustrates a side view of the tape head assembly according to the present invention.

FIG. 7 illustrates a side view of the tape head assembly 700 according to the present invention. In FIG. 7, the tape head assembly 700 includes a read-after-write pair of magnetic recording heads 710, 712 attached to two rigid, precision U-shaped support beams 720, 722. Wafer processed thin film tape heads 710, 712 are fabricated and bonded to the top surfaces of the U-beams 720, 722. Cables 730, 732 are electrically attached to the heads 710, 712 and bonded to the U-beams 720, 722 for strain relief in the region between the legs. The cabled beams 720, 722 are then positioned with the end surfaces 740 of the legs of one in close proximity to those of its companion. Critical height, wrap angle and track-to-track alignments are performed. Finally, the beams are bonded together using a joining agent in the narrow gap between the ends of the legs. The required tolerances for tape wrap angle setting, track-to-track registration, and head-to-head parallelism are achieved by minimizing relative motion of the two halves during joining agent setting, because lateral forces exerted by the joining agent are generally small and the horizontal component tends to cancel, as there are two legs.

Figure 8:
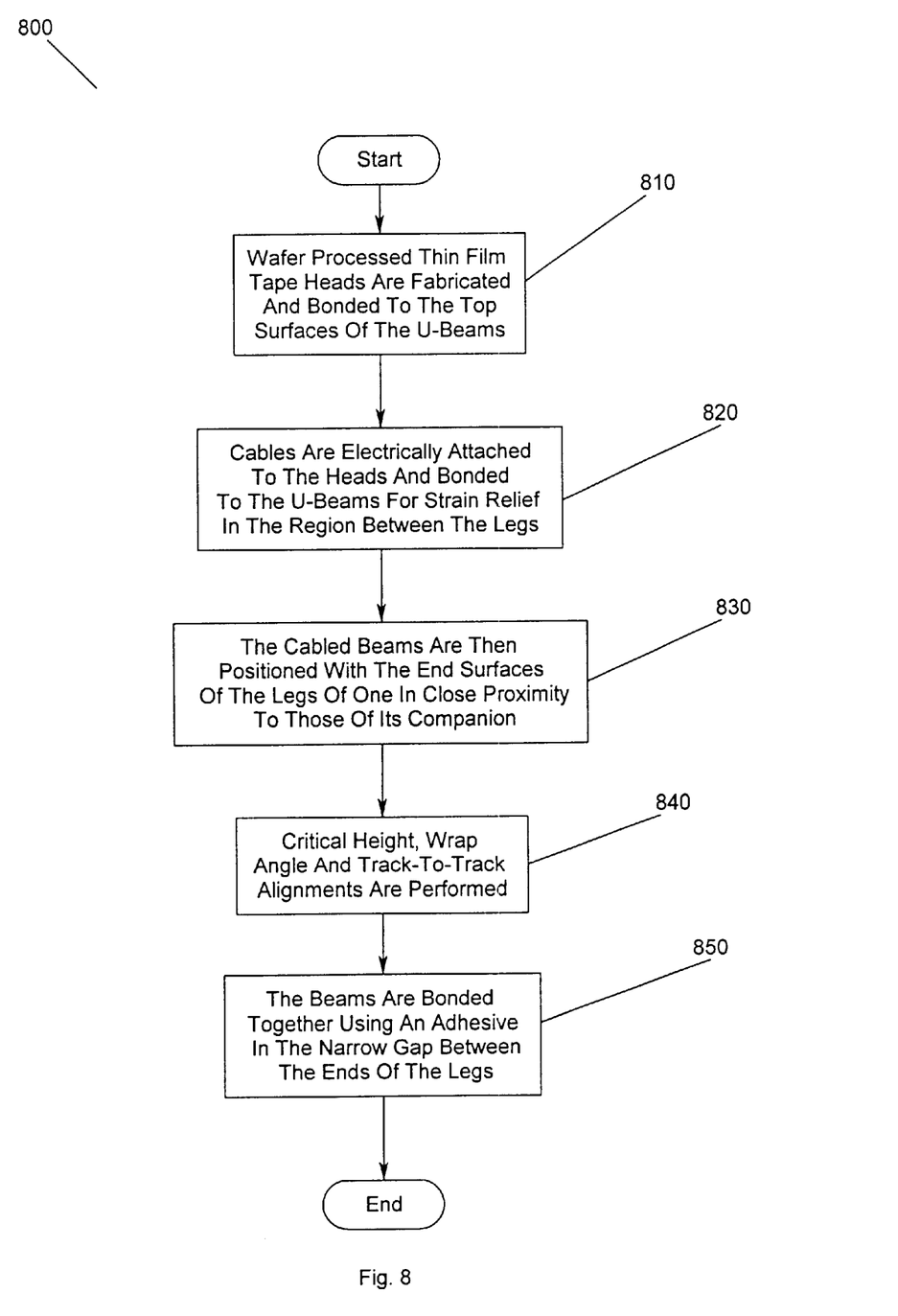
FIG. 8 is a flow chart of the method for providing tape head assemblies for very high density recording according to the present invention.

FIG. 8 is a flow chart 800 of the method for providing tape head assemblies that prevent relative motion of this alignment during curing of the joining agent according to the present invention. Wafer processed thin film tape heads are fabricated and bonded to the top surfaces of the U-beams 810. Cables are electrically attached to the heads and bonded to the U-beams for strain relief in the region between the legs 820. The cabled beams are then positioned with the end surfaces of the legs of one in close proximity to those of its companion 830. Critical height, wrap angle and track-to-track alignments are performed 840. The beams may then be bonded together using a joining agent in the narrow gap between the ends of the legs 850.

FIG. 9 illustrates a perspective view of the tape head sub-assembly 900 of FIG. 5 according to an embodiment of the present invention. In FIG. 9, the tape head sub-assembly 900 includes a transducer structure or thin film tape head 910, for example comprising a read-after-write pair of magnetic heads or transducers, attached to a rigid, precision U-shaped support beam 920. The tape head sub-assembly 900 includes an angled surface 930 of the U-beam 920 to ensure a uniform joining gap.

Figure 10:
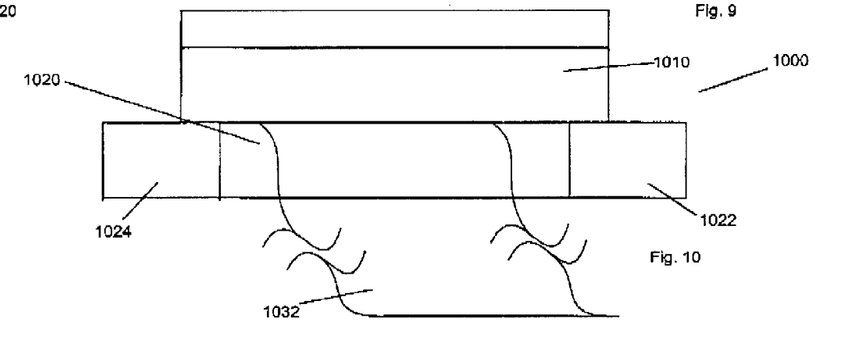
FIG. 10 illustrates a frontal view of the tape head sub-assembly of FIG. 5 according to an embodiment of the present invention.

FIG. 10 illustrates a frontal view of the tape head sub-assembly 1000 of FIG. 5 according to an embodiment of the present invention. In FIG. 10, the tape head sub-assembly 1000 includes a transducer structure or thin film tape head 1010, for example comprising a read-after-write pair of magnetic heads or transducers, attached to a rigid, precision U-shaped support beam 1020. The U-shaped support beam 1020 includes two legs 1022, 1024. A cable 1032 is coupled to the thin film tape head 1010 and is disposed between the two legs 1022, 1024 of the U-shaped support beam 1020.

The present invention is compatible with both tape bearing surface-up and tape air bearing surface-down assembly methods. Further, the present invention can be used for both full span tape heads and for partial span and so-called 'dimple' tape heads. For the latter, one or more recesses are required to accommodate the chiplet tape head.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A tape head sub-assembly, comprising:
   a U-shaped support beam having a cross member and two legs, the U-shaped support beam having engagement surfaces on the legs of the support beam and a recessed area disposed between the legs of the support beam, wherein the engagement surfaces are angled to provide a predetermined tape wrap angle; and
   a tape head disposed on the cross member and two legs of the support beam,
   wherein the recess area provides a cable receptacle for framing a cable that is attached to the tape head.

2. The tape head sub-assembly of claim 1 wherein the tape head comprises a substrate and a closure piece separated by a plurality of layers forming magnetic transducers.

3. The tape head sub-assembly of claim 1 wherein the tape head comprises a substrate and a closure piece separated by a plurality of layers forming magnetic transducers.

4. A tape head assembly, comprising a matched support beam pair, each support beam having a tape head disposed on the support beam, each support beam further including engagement surfaces and a recessed area disposed between the engagement surfaces, the matched pair being joined at the engagement surfaces, and the recess areas providing a cable receptacle for framing a cable that is attached to the tape head.

5. The tape head assembly of claim 4 wherein each of the support beams further include an angled engagement surface to provide a predetermined tape wrap angle.

6. The tape head assembly of claim 5 wherein the tape wrap angle is approximately 1.2 to 2.0 degrees.

7. The tape head assembly of claim 5 wherein each of the tape heads includes a substrate and a closure piece separated by a plurality of layers forming magnetic transducers.

8. The tape head assembly of claim 7 wherein the engagement areas are aligned to provide critical height, wrap angle and track-to-track alignment.

9. The tape head assembly of claim 5 further comprising a joining agent disposed between the engagement areas to join the two support beams together.

10. The tape head assembly of claim 4 wherein each of the support beams further includes an angled top surface to provide a predetermined tape wrap angle.

11. The tape head assembly of claim 10 wherein the tape wrap angle is approximately 1.2 to 2.0 degrees.

12. The tape head assembly of claim 4 wherein each of the tape heads includes a substrate and a closure piece separated by a plurality of layers forming magnetic transducers.

13. The tape head assembly of claim 4 wherein the engagement areas are aligned to provide critical height, wrap angle and track-to-track alignment.

14. The tape head assembly of claim 4 further comprising a joining agent disposed between the engagement areas to join the two support beams together.

15. A tape head assembly, comprising a pair of matched support means, each support means including a tape head disposed on the support beam, each support means further including engagement means, and a cable receptacle means disposed between the engagement means for framing a cable that is attached to the tape head, and the pair of matched support means being joined at the engagement means.

16. A method for forming a tape head, comprising:
   positioning a pair of support beams each having angled engagement areas and a recessed area with the angled engagement areas of a first of the pair of support beams in close proximity to the angled engagement areas of a second of the pair of support beams;
   performing a predetermined alignment of the pair of support beams; and
   joining the pair of support beams together using a joining agent in a gap between the engagement areas of the support beams to provide planes for providing a predetermined tape wrap angle.

17. The method of claim 16 wherein the support beams further comprise a tape head bonded to a top surface of each support beam.

18. The method of claim 16 wherein the tape heads comprise wafer processed thin film tape heads.

19. The method of claim 16 further comprises coupling cables to the tape heads and to the support beams in the recessed areas to provide strain relief in the region between the engagement areas.

20. The method of claim 16 wherein the support beams are generally U-shaped.

21. The method of claim 16 wherein performing a predetermined alignment of the pair of support beams further comprises performing height, wrap angle and track-to-track alignments.

* * * * *

UNITED STATES PATENT AND TRADEMARK OFFICE
CERTIFICATE OF CORRECTION

PATENT NO. : 6,781,792 B2
DATED : August 24, 2004
INVENTOR(S) : Biskeborn

It is certified that error appears in the above-identified patent and that said Letters Patent is hereby corrected as shown below:

Column 2,
Line 7, "device (DASD))" should read -- device (DASD) --.

Column 6,
Line 15, "together (as will be" should read -- together (as will be described below). According to the present invention, the head joining process can be automated and results in components that are very flat. Furthermore, the flatness can be controlled by surface stress conditioning of both the beams 520 and the tape heads 510. Tape head sub-assembly 500 constructed according to the present invention is suitable for very high-density tape recording, such as flat head recording technology. Previous head build methods do not generally have the required level of precision for flat heads. Flat heads require an internal tape wrap of approximately 1.8 degrees per side. Accordingly, the 1.8 degree angle 530 is built into the U-beam 520 to ensure a uniform joining gap. --.

Signed and Sealed this

Eleventh Day of January, 2005

JON W. DUDAS
*Director of the United States Patent and Trademark Office*